(12) United States Patent
Dong

(10) Patent No.: US 10,573,053 B2
(45) Date of Patent: Feb. 25, 2020

(54) METHOD AND APPARATUS FOR ANIMATING IMAGES ON MOBILE DEVICES

(71) Applicant: Alibaba Group Holding Limited, George Town (KY)

(72) Inventor: Xiaoqing Dong, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/388,599

(22) Filed: Apr. 18, 2019

(65) Prior Publication Data

US 2019/0251731 A1    Aug. 15, 2019

Related U.S. Application Data

(63) Continuation of application No. PCT/CN2017/105811, filed on Oct. 12, 2017.

(30) Foreign Application Priority Data

Oct. 19, 2016   (CN) .......................... 2016 1 0913050

(51) Int. Cl.
  *G06T 13/80*     (2011.01)
  *G06T 11/20*     (2006.01)

(52) U.S. Cl.
  CPC ............ *G06T 13/80* (2013.01); *G06T 11/206* (2013.01)

(58) Field of Classification Search
  CPC ....... G06T 13/80; G06T 11/206; G06T 15/00; G06F 3/04845; G06F 3/1292;
  (Continued)

(56) References Cited

U.S. PATENT DOCUMENTS

2008/0055315 A1   3/2008   Ducharme
2010/0110081 A1*  5/2010   Arora ...................... G06T 13/00
                                                          345/473
(Continued)

FOREIGN PATENT DOCUMENTS

CN       103177465       6/2013
CN       104123742       10/2014
(Continued)

OTHER PUBLICATIONS

International Search Report and Written Opinion issued in International Application No. PCT/CN2017/105811 dated Jan. 12, 2018, 10 pages (with English translation).

(Continued)

*Primary Examiner* — Xilin Guo
(74) *Attorney, Agent, or Firm* — Fish & Richardson P.C.

(57) ABSTRACT

The present application describes techniques for animating images on mobile devices. One example method includes: drawing a final image to be displayed on a hidden canvas; storing the drawn image as an endpoint image; determining a changing display parameter based on an animation effect, wherein the display parameter comprises a display location parameter and each frame of a screenshot parameter determined based on an animation effect; and displaying at least a part of the endpoint image frame by frame in an animation area at a certain interval by displaying, frame by frame in the animation area at the certain interval using the display location parameter, a part of the endpoint image captured based on the screenshot parameter of the frame, until the endpoint image is finally displayed.

20 Claims, 7 Drawing Sheets

(58) Field of Classification Search
CPC .... G06F 3/0481; G06F 3/04815; G06F 21/44;
G06F 16/986; G06F 17/241; G06F 9/451
See application file for complete search history.

(56) References Cited

U.S. PATENT DOCUMENTS

| | | | |
|---|---|---|---|
| 2012/0013621 A1* | 1/2012 | Ospina Gonzalez | G06T 13/80 345/473 |
| 2013/0120439 A1* | 5/2013 | Harris | G11B 27/034 345/619 |
| 2014/0028685 A1* | 1/2014 | Weskamp | G06T 3/60 345/473 |
| 2014/0282124 A1 | 9/2014 | Grealish et al. | |

FOREIGN PATENT DOCUMENTS

| | | |
|---|---|---|
| CN | 104967893 | 10/2015 |
| CN | 105719332 | 6/2016 |
| CN | 105786417 | 7/2016 |
| CN | 105988762 | 10/2016 |
| CN | 105988793 | 10/2016 |
| CN | 107015788 | 8/2017 |

OTHER PUBLICATIONS

Extended European Search Report in European Application No. 17862403.7, dated Sep. 20, 2019, 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

METHOD AND APPARATUS FOR ANIMATING IMAGES ON MOBILE DEVICES

CROSS-REFERENCE TO RELATED APPLICATIONS

This application is a continuation of PCT Application No. PCT/CN2017/105811, filed on Oct. 12, 2017, which claims priority to Chinese Patent Application No. 201610913050.8, filed on Oct. 19, 2016, and each application is hereby incorporated by reference in its entirety.

TECHNICAL FIELD

The present application relates to the field of network communications technologies, and in particular, to a method and an apparatus for animating images on mobile devices.

BACKGROUND

With performance development of mobile devices, complexity and friendliness of user interfaces running on the mobile devices are also respectively reduced and improved. To implement better user experience, more and more network service providers display various materials on browser pages or client interfaces by using an animation method.

In the existing technology, animation implementation on mobile devices usually uses a solution on a personal computer (PC). To be specific, data used for display such as the size and a location of each frame of image is calculated, and both the data used for display and data of the image are buffered in a memory. In an animation execution process, current content on canvases is cleared at a certain interval, and a next frame of display content is redrawn on the canvases by using a buffered next frame of data.

In such the solution, information about a hierarchy and an attribute of each frame of image needs to be recorded. Consequently, a programming code amount is quite large, much memory is occupied to buffer data of each frame of image, and more processing capabilities are consumed to redraw each frame of image. Because hardware resources and operation speeds of the mobile devices are still quite poorer than those of the PCs, such the solution has problems of an excessively large code amount, high memory overheads, and low execution efficiency.

SUMMARY

In view of this, the present application provides a method for animating images on mobile devices, including: drawing a final image to be displayed on a hidden canvas, and storing the drawn image as an endpoint image; and displaying at least a part of the endpoint image frame by frame in an animation area at a certain interval by using a changing display parameter, until the endpoint image is finally displayed, where the changing display parameter is determined based on an animation effect.

The present application further provides an apparatus for animating images on mobile devices, including: an endpoint image generation unit, configured to draw a final image to be displayed on a hidden canvas, and store the drawn image as an endpoint image; and an animation display unit, configured to display at least a part of the endpoint image frame by frame in an animation area at a certain interval by using a changing display parameter, until the endpoint image is finally displayed, where the changing display parameter is determined based on an animation effect.

It can be learned from the previously described technical solutions that in the implementations of the present application, the final image to be displayed is drawn on the hidden canvas and stored as the endpoint image, and the endpoint image is displayed in an animation execution process by using a changing display parameter. Therefore, there is no need to calculate, buffer, and draw each frame of image in an animation process frame by frame, so as to reduce a code amount needed for animation, reduce memory occupation, and improve animation execution efficiency.

DESCRIPTION OF IMPLEMENTATIONS

The implementations of the present application provide a new method for animating images on mobile devices. An image to be displayed as an animation endpoint is drawn on a hidden canvas, and is stored as an endpoint image. In an animation execution process, each frame of display parameter is determined based on an animation effect to be displayed, and a part of or all of the endpoint image is displayed by using each frame of display parameter, until the endpoint image is finally displayed. In the implementations of the present application, an animation effect is achieved by displaying all or a part of the endpoint image through changing display, so as to avoid calculating and recording information about a hierarchy and an attribute of each frame of image in an animation process, and reduce a programming code amount. In the animation process, a drawn image is used, and therefore there is no need to draw each frame of image or buffer data of each frame of image, so as to reduce memory occupation and processing capability consumption, and alleviate problems in the existing technology.

The implementations of the present application can be applied to any mobile device having computing, storage, and display capabilities, for example, a device such as a mobile phone, a tablet computer, and a notebook. In terms of software, the implementations of the present application can be applied to a client in a client/server (C/S) structure, or can be applied to a browser page in a browser/server (B/S) structure, or can be applied to other software running on a mobile device.

Figure 1:
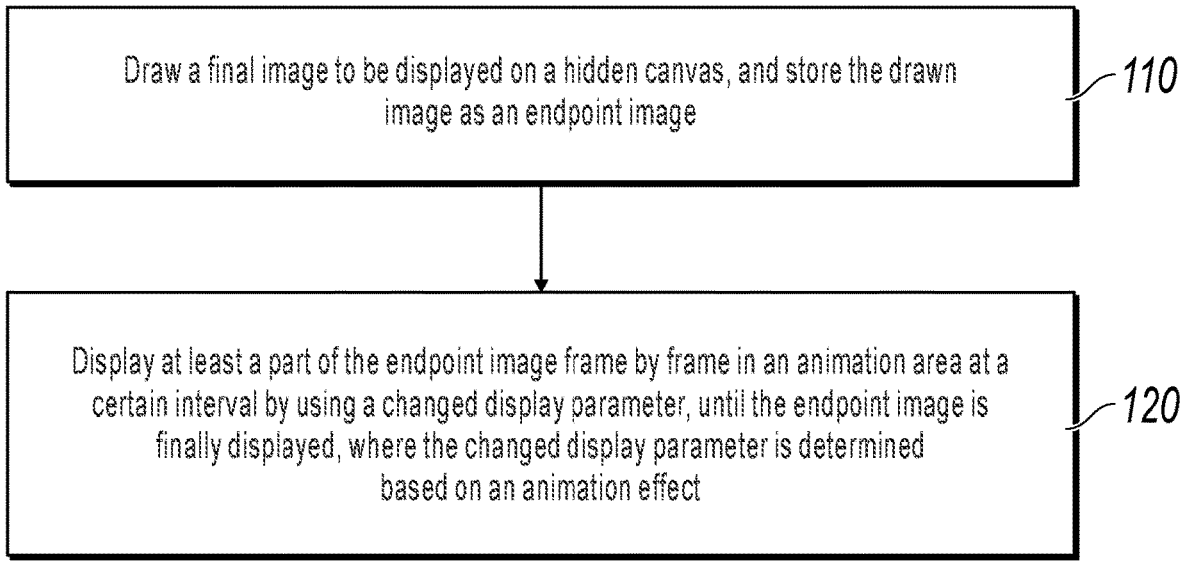
FIG. 1 is a flowchart illustrating a method for animating images on mobile devices, according to an implementation of the present application.

In the implementations of the present application, a procedure of the method for animating images on mobile devices is shown in FIG. 1.

Step 110: Draw a final image to be displayed on a hidden canvas, and store the drawn image as an endpoint image.

A mobile device creates the hidden canvas, draws the final image to be displayed, namely, the image to be displayed to a user at the end of an animation on the hidden canvas, and stores the image drawn on the hidden canvas as the endpoint image.

Data needed by the mobile device to draw the final image to be displayed can be determined based on content to be displayed on the image in actual application scenarios. The data needed for drawing the image can be locally read or calculated by the mobile device, or can be obtained from a server or calculated based on other data obtained from the server. For a specific drawing method used when the image is drawn, reference can be made to the existing technology. A data source for drawing the image, display content of the image, and an image drawing method are not limited in this implementation of the present application.

The mobile device can create the hidden canvas based on an animation area. For example, referring to peak data of the finally displayed image, a hidden canvas that is scaled up or scaled down in a same proportion can be created based on the shape of the animation area. For another example, a hidden canvas that has a same shape and size as the animation area can be created. As such, the endpoint image can be directly displayed in the animation area at the end of the animation without a need for scale-up or scale-down, so as to simplify calculation. Certainly, the mobile device can randomly create the hidden canvas, and in a subsequent animation process, all or a part of the endpoint image is displayed in the animation area by setting a display parameter.

The endpoint image drawn on the hidden canvas can be locally stored in the mobile device in a form of a file, or can be stored in a buffer in a form of image data. The hidden canvas can be deleted after the endpoint image is stored.

Step 120: Display at least a part of the endpoint image frame by frame in an animation area at a certain interval by using a changing display parameter, until the endpoint image is finally displayed.

After the endpoint image is generated, various frames of display parameters in the animation execution process are determined based on an animation effect to be displayed, and the various frames of display parameters are successively used at a certain interval to display a part of or all of the endpoint image in the animation area, until the endpoint image is displayed at the end of the animation. Display parameters of adjacent frames are different, and a changing mode is related to an animation effect to be displayed.

The display parameter can include an endpoint image processing parameter used to process the endpoint image to obtain each frame of image, and a display location parameter used to determine a location in the animation area that the processed endpoint image is displayed at. Adjacent frames are different in at least one of an endpoint image processing parameter or a display location parameter. In the animation execution process, the mobile device processes the endpoint image based on each frame of endpoint image processing parameter, to obtain an image of the frame, and displays the image of the frame in the animation area at a time point corresponding to each frame of image (images of two adjacent frames are spaced by the previously described interval) by using a display location parameter of the frame. Different animation effects can be achieved when endpoint image processing parameters of adjacent frames change, or display location parameters change, or both endpoint image processing parameters and display location parameters change. The following provides description by using examples.

In a first example, a fixed display location parameter and each frame of screenshot parameter determined based on an animation effect are used as changing display parameters, so as to achieve an effect of gradually displaying the endpoint image in the animation area. A part of the endpoint image captured based on each frame of screenshot parameter is displayed frame by frame in the animation area at a certain interval by using the fixed display location parameter, until the entire endpoint image is finally displayed. To be specific, at a time point corresponding to each frame, the mobile device captures a part of the endpoint image based on the screenshot parameter of the frame, to obtain an image of the frame, and displays the image of the frame in the animation area based on the fixed display location parameter. The image captured based on the screenshot parameter is gradually enlarging, until the complete endpoint image is formed.

In an application of the first example, a display location parameter in an upper left corner of each frame of image can be fixed as an upper left corner of the animation area, a part of the endpoint image on the left is captured as each frame of image, and a captured area is gradually enlarging, so as to achieve an animation effect of gradually displaying the endpoint image from left to right. In another application of the first example, a display location parameter of a central point of each frame of image can be fixed as a central point of the animation area, a central point of the endpoint image is used as a central point of each frame of image that is captured, and a captured area is gradually enlarging, so as to achieve an animation effect of gradually displaying the endpoint image from the center to the periphery. Other application scenarios are omitted here for simplicity.

In a second example, each frame of display location parameter determined based on an animation effect and each frame of screenshot parameter are used as changing display parameters, so as to achieve an effect of gradually moving the endpoint image from the outside of the animation area to the animation area for display. A part of the endpoint image captured based on the screenshot parameter of the frame is displayed frame by frame in the animation area at a certain interval by using the display location parameter of the frame, until the entire endpoint image is finally displayed. To be specific, at a time point corresponding to each frame, the mobile device captures a part of the endpoint image based on the screenshot parameter of the frame, to obtain an image of the frame, and displays the image of the frame in the animation area based on the display location parameter of the frame. The image captured based on the screenshot parameter is gradually enlarging, and a display location of the image also correspondingly moves, so that the image of the frame can be completely displayed in the animation area until the last frame of image becomes a complete endpoint image and occupies the entire animation area.

In an application of the second example, a display location parameter in an upper right corner of each frame of image can be gradually shifted rightward along an upper edge of the animation area, a part of the endpoint image on the left is captured as each frame of image (the size of the image corresponds to the display location parameter), and a captured area is gradually enlarging, so as to achieve an effect of moving the endpoint image to the animation area from left to right. Other application scenarios are omitted here for simplicity.

In a third example, a fixed display location parameter and each frame of compression parameter determined based on an animation effect are used as changing display parameters, so as to achieve an effect that the entire endpoint image gradually occupies the entire animation area. An endpoint image obtained by performing compression based on the compression parameter of the frame is displayed frame by frame in the animation area at a certain interval by using the display location parameter, until an endpoint image matching the animation area is finally displayed. To be specific, at a time point corresponding to each frame, the mobile device obtains the image of the frame after compressing the endpoint image based on the compression parameter of the frame, and displays the image of the frame in the animation area based on the fixed display location parameter. Each frame of image obtained by performing compression based on the compression parameter is gradually enlarging until the entire animation area is occupied.

In an application of the third example, a display location parameter of an upper left corner of each frame of image can be fixed as an upper left corner of the animation area, proportional compression is performed in each frame based on a length-width ratio of the endpoint image, and a compression ratio is gradually decreasing, so as to achieve an effect of gradually animating the endpoint image from the upper left corner of the animation area from far to near. In another application of the third example, a display location parameter of a lower edge of each frame of image can be fixed as a lower edge of the animation area, a width of the endpoint image is compressed in each frame, and a compression ratio is gradually decreasing, so as to achieve an effect that the endpoint image gradually occupies the entire animation area starting from the bottom. Other application scenarios are omitted here for simplicity.

When animation effects to be achieved are different, other endpoint image processing parameters different from the screenshot parameter and the compression parameter can be used, for example, a rotation parameter for rotating the endpoint image and a filter parameter for performing color processing on the endpoint image. In addition, multiprocessing can be performed on the endpoint image with reference to various different endpoint image processing parameters. For example, by combining the compression parameter with the rotation parameter, an animation effect of gradually rotating the entire endpoint image by using a certain point as a central point can be achieved. A type and a quantity of the endpoint image processing parameter to be used, and combined usage of the endpoint image processing parameter and the fixed or changing display location parameter are not limited in this implementation of the present application.

It can be learned that in this implementation of the present application, the final image to be displayed is drawn on the hidden canvas and stored as the endpoint image. In an animation execution process, each frame of display parameter is determined based on an animation effect to be displayed, a part of or all of the endpoint image is displayed by using each frame of display parameter, and an animation effect is achieved by using a changing display parameter, so as to avoid calculating and recording information about a hierarchy and an attribute of each frame of image in an animation process, and reduce a programming code amount. In the animation process, the endpoint image is used, and therefore there is no need to draw each frame of image and buffer data of each frame of image, so as to reduce memory occupation, and improve animation execution efficiency.

In an application example of the present application, in a browser environment of a smartphone, an animation effect is used when a graph (including a trending graph and a bar graph) is displayed to the user.

Figure 2:
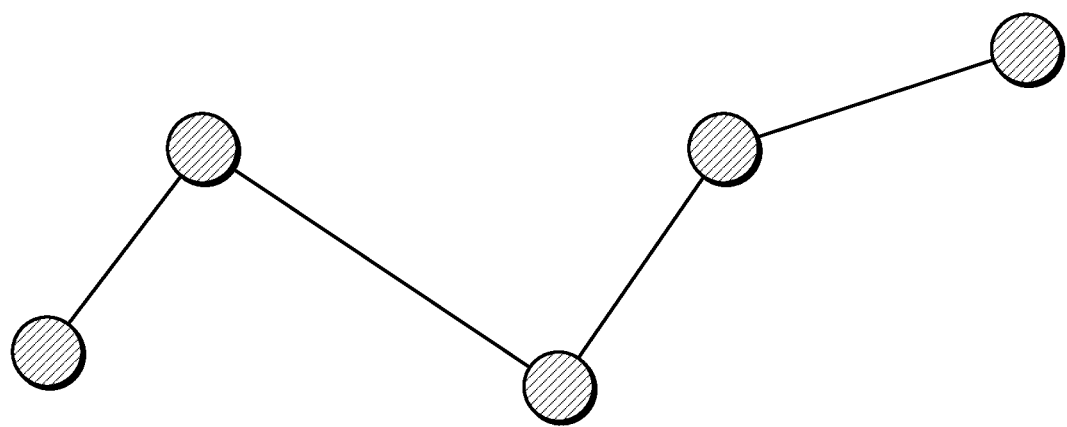
FIG. 2 is an example diagram of an endpoint image in a trending graph, according to an application example of the present application.

When the trending graph needs to be displayed on a browser page, a hidden canvas with the same size as a display area of the trending graph is created, and a final trending graph to be displayed to the user is drawn on the hidden canvas based on graphic data of the trending graph received from the server, as shown in FIG. 2. The drawn trending graph is buffered in the memory as an endpoint image of the trending graph.

Figure 3:
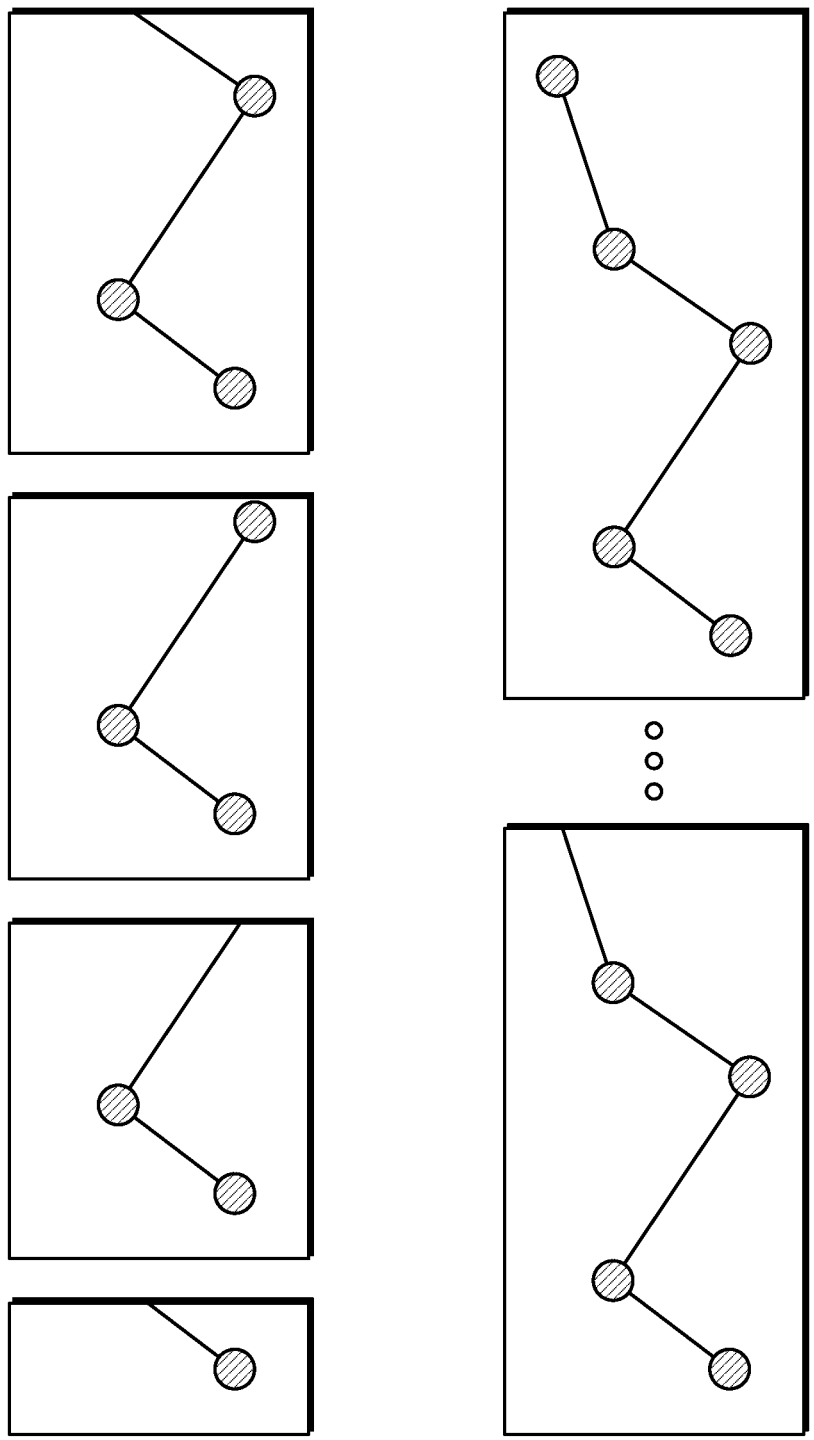
FIG. 3 is a schematic diagram of displaying each frame of image sequence of an animation in a trending graph, according to an application example of the present application.

The trending graph is a change trending graph that shows a certain variable changes in chronological order. When the trending graph is displayed, an animation effect of gradually forming a variable trend in chronological order is used. Therefore, a fixed display location parameter and a changed screenshot parameter can be used as display parameters. A display location parameter in an upper left corner of each frame of image is fixed as an upper left corner of the display area of the trending graph. Some endpoint images with different lengths of the trending graph are captured in each frame starting from the left of the endpoint image of the trending graph to serve as an image of the frame, and a captured length is gradually increasing. A possible frames sequence is shown in FIG. 3. As such, when various frames of images are successively displayed in the display area of the trending graph at a certain interval, an animation effect that a variable trend occurs in chronological order is formed.

Figure 4:
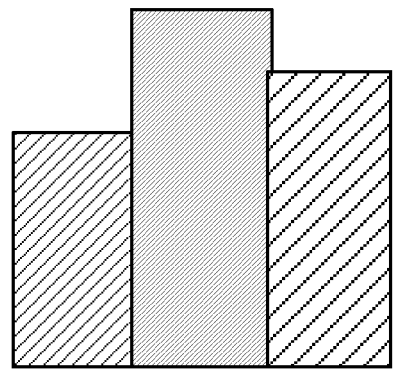
FIG. 4 is an example diagram of an endpoint image in a bar graph, according to an application example of the present application.

When the bar graph needs to be displayed on a browser page, a hidden canvas with the same size as a display area of the bar graph is created, and a final bar graph to be displayed to the user is drawn on the hidden canvas based on graphic data of the bar graph received from the server, as shown in FIG. 4. The drawn bar graph is buffered in the memory as an endpoint image of the bar graph.

Figure 5:
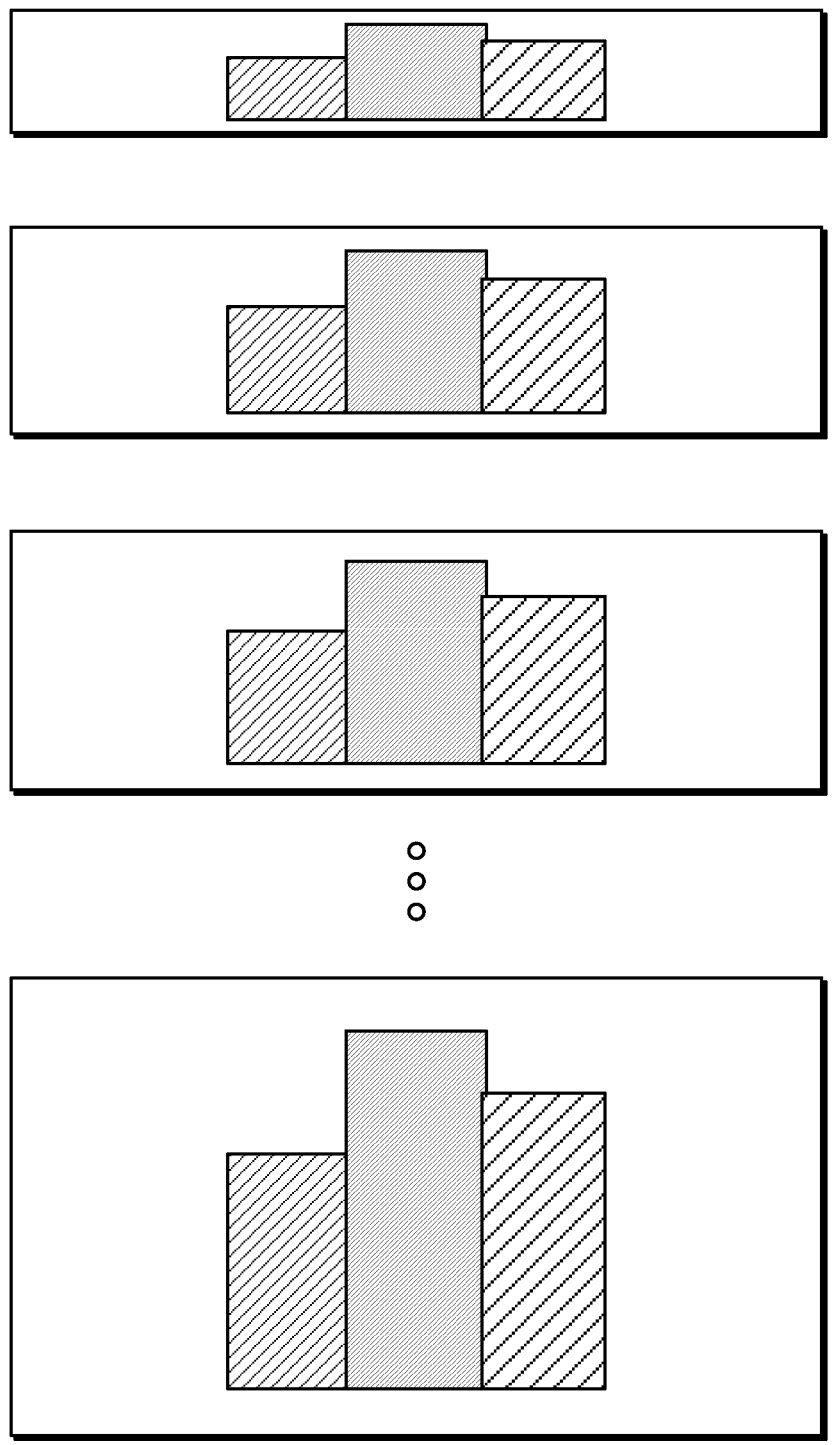
FIG. 5 is a schematic diagram of displaying each frame of image sequence of an animation in a bar graph, according to an application example of the present application.

The bar diagram is used to reflect a value of a certain variable at a certain time point. When the bar graph is displayed, an animation effect of gradually changing the bar to a final value in ascending order is used. Therefore, a fixed display location parameter and a changed compression parameter can be used as display parameters. A display location parameter of a lower left corner of each frame of image is fixed as a lower left corner of the display area of the bar graph. An image of the frame is generated after a width of an endpoint image of the bar graph is compressed in different compression proportions in each frame, and a compression ratio is gradually decreasing until a compression proportion of the last frame of image is 1. A possible each frame of image sequence is shown in FIG. 5. As such, when various frames of images are successively displayed in the display area of the bar graph at a certain interval, an animation effect that a variable value is gradually increasing until a final value is reached is formed.

Figure 6:
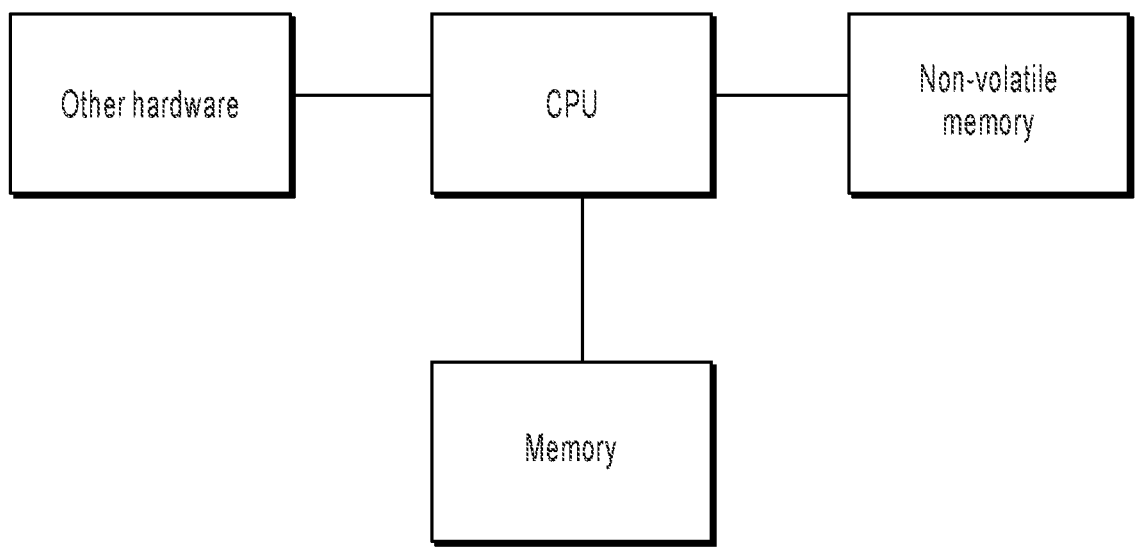
FIG. 6 is a hardware structure diagram of a mobile device.

Corresponding to the previously described procedure implementations, an implementation of the present application further provides an apparatus for animating images on mobile devices. The apparatus can be implemented by using software, or can be implemented by using hardware, or can be implemented by using a combination of hardware and software. By using software implementation as an example, a logical apparatus is obtained by reading a corresponding computer program instruction to a memory by using a central processing unit (CPU) of a mobile device. In terms of hardware, in addition to the CPU, the memory, and the non-volatile memory shown in FIG. 6, the mobile device that the apparatus for animating images on mobile devices is located in usually further includes other hardware such as a chip for receiving and sending a wireless signal, and/or other hardware such as a board card for implementing a network communication function.

Figure 7:
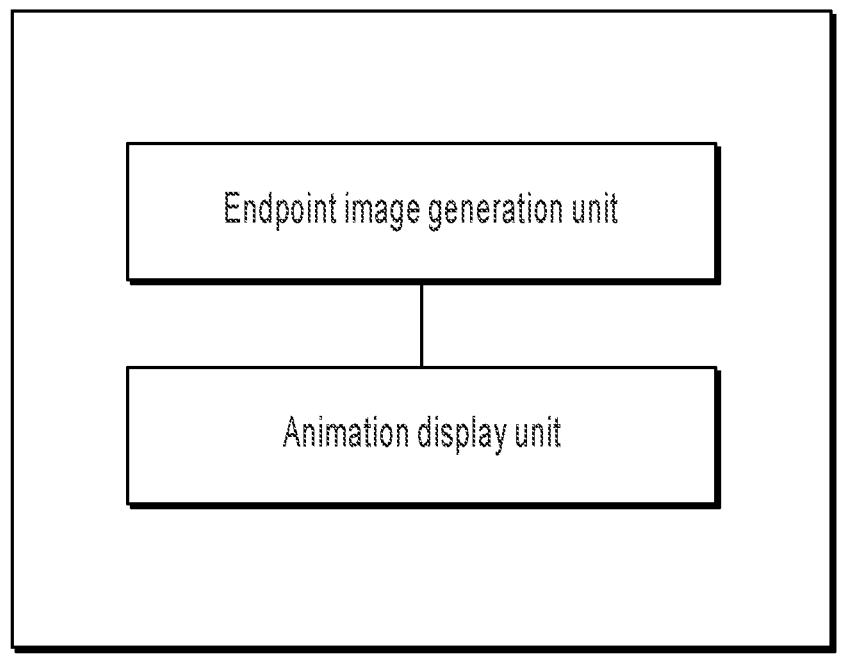
FIG. 7 is a logical structure diagram of an apparatus for animating images on mobile devices, according to an implementation of the present application.

FIG. 7 shows an apparatus for animating images on mobile devices according to an implementation of the present application, including an endpoint image generation unit and an animation display unit. The endpoint image generation unit is configured to draw a final image to be displayed on a hidden canvas, and store the drawn image as an endpoint image. The animation display unit is configured to display at least a part of the endpoint image frame by frame in an animation area at a certain interval by using a changing display parameter, until the endpoint image is finally displayed. The changing display parameter is determined based on an animation effect.

Optionally, the display parameter includes an endpoint image processing parameter used to process the endpoint image to obtain each frame of image, and a display location parameter used to determine a display location of each frame of image in the animation area, and adjacent frames are different in at least one of an endpoint image processing parameter and a display location parameter.

In an example, the display parameter includes a display location parameter and each frame of screenshot parameter determined based on an animation effect. The animation display unit is specifically configured to display, frame by frame in the animation area at the certain interval by using the display location parameter, a part of the endpoint image captured based on the screenshot parameter of the frame, until the entire endpoint image is finally displayed.

In another example, the display parameter includes each frame of display location parameter determined based on an animation effect and a screenshot parameter. The animation display unit is specifically configured to display, frame by frame in the animation area at the certain interval by using the display location parameter of the frame, a part of the endpoint image captured based on the screenshot parameter of the frame, until the entire endpoint image is finally displayed.

In still another example, the display parameter includes a display location parameter and each frame of compression parameter determined based on an animation effect. The animation display unit is specifically configured to display, frame by frame in the animation area at the certain interval by using the display location parameter, an endpoint image obtained by performing compression based on the compression parameter of the frame, until an endpoint image matching the animation area is finally displayed.

Optionally, the shape and the size of the hidden canvas are the same as those of the animation area.

Optionally, the apparatus further includes a hidden canvas deletion unit, configured to delete the hidden canvas after the endpoint image is stored.

The previous descriptions are merely preferred implementations of the present application, but are not intended to limit the present application. Any modification, equivalent replacement, or improvement made without departing from the spirit and principle of the present application should fall within the protection scope of the present application.

In a typical configuration, a computing device includes one or more processors (CPU), one or more input/output interfaces, one or more network interfaces, and one or more memories.

The memory can include a non-permanent memory in a computer readable medium, a random access memory (RAM), and/or a non-volatile memory such as a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage or another magnetic storage device, or any other non-transmission medium, and can be used to store information that can be accessed by the computing device. As described in the present specification, the computer readable medium does not include a transitory computer readable media (transitory media) such as a modulated data signal and carrier.

It should be noted that the terms "include", "comprise", or their any other variant is intended to cover a non-exclusive inclusion, so that a process, a method, an article, or an apparatus that includes a list of elements not only includes those elements but also includes other elements that are not expressly listed, or further includes elements inherent to such process, method, article, or apparatus. An element preceded by "includes a . . . " does not, without more constraints, preclude the presence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer usable storage media (including but not limited to a disk memory, a CD-ROM, an optical memory, etc.) that include computer usable program code.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for animating images on mobile devices, the method comprising:

receiving, by one or more processors, a user input comprising a drawing and an animation effect, the drawing comprising an endpoint image to be displayed on a hidden canvas;

storing, by the one or more processors, the endpoint image as the last frame of a plurality of frames;

determining, by the one or more processors, a display parameter that changes based on an animation effect, wherein the display parameter comprises an image displaying parameter and a display location parameter;

processing, by the one or more processors, at least a portion of the endpoint image using a variable dimension ratio of the endpoint image to generate at least a processed portion of the endpoint image for each frame of the plurality of frames, the variable dimension ratio being determined based on the image displaying parameter and gradually changing between the plurality of frames to generate an animation of the endpoint image corresponding to the image displaying parameter; and displaying frame by frame, in an animation area at an interval each frame of the plurality of frames using the display location parameter, until the endpoint image is displayed.

2. The computer-implemented method of claim 1, wherein the display parameter comprises an endpoint image displaying parameter used to process the endpoint image to obtain each frame of image, the display location parameter used to determine a display location of each frame of image in the animation area, and adjacent frames that are different in at least one of an endpoint image displaying parameter and the display location parameter.

3. The computer-implemented method of claim 2, wherein the display parameter comprises each frame of display location parameter determined based on an animation effect and a screenshot parameter.

4. The computer-implemented method of claim 3, wherein displaying at least a part of the endpoint image frame by frame in an animation area at a interval by using a changing display parameter, until the endpoint image is finally displayed comprises:

displaying, frame by frame in the animation area at the interval by using the display location parameter of the frame, a part of the endpoint image captured based on the screenshot parameter of the frame, until the entire endpoint image is finally displayed.

5. The computer-implemented method of claim 2, wherein the display parameter comprises a display location parameter and each frame of compression parameter determined based on an animation effect.

6. The computer-implemented method of claim 5, wherein displaying at least a part of the endpoint image frame by frame in an animation area at a interval by using a changing display parameter, until the endpoint image is finally displayed comprises:

displaying, frame by frame in the animation area at the interval by using the display location parameter, an endpoint image obtained by performing compression based on the compression parameter of the frame, until an endpoint image matching the animation area is finally displayed.

7. The computer-implemented method of claim 1, wherein a shape and a size of the hidden canvas are the same as those of the animation area.

8. The computer-implemented method of claim 1, wherein the method further comprises: deleting the hidden canvas after the endpoint image is stored.

9. A non-transitory, computer-readable medium storing one or more instructions executable by a computer system to perform operations comprising:

receiving, by one or more processors, a user input comprising a drawing and an animation effect, the drawing comprising an endpoint image to be displayed on a hidden canvas;

storing, by the one or more processors, the endpoint image as the last frame of a plurality of frames;

determining, by the one or more processors, a display parameter that changes based on an animation effect, wherein the display parameter comprises an image displaying parameter and a display location parameter;

processing, by the one or more processors, at least a portion of the endpoint image using a variable dimension ratio of the endpoint image to generate at least a processed portion of the endpoint image for each frame of the plurality of frames, the variable dimension ratio being determined based on the image displaying parameter and gradually changing between the plurality of frames to generate an animation of the endpoint image corresponding to the image displaying parameter; and displaying frame by frame, in an animation area at an interval each frame of the plurality of frames using the display location parameter, until the endpoint image is displayed.

10. The non-transitory, computer-readable medium of claim 9, wherein the display parameter comprises an endpoint image displaying parameter used to process the endpoint image to obtain each frame of image, the display location parameter used to determine a display location of each frame of image in the animation area, and adjacent frames that are different in at least one of an endpoint image displaying parameter and the display location parameter.

11. The non-transitory, computer-readable medium of claim 10, wherein the display parameter comprises each frame of display location parameter determined based on an animation effect and a screenshot parameter.

12. The non-transitory, computer-readable medium of claim 11, wherein displaying at least a part of the endpoint image frame by frame in an animation area at a interval by using a changing display parameter, until the endpoint image is finally displayed comprises:

displaying, frame by frame in the animation area at the interval by using the display location parameter of the frame, a part of the endpoint image captured based on the screenshot parameter of the frame, until the entire endpoint image is finally displayed.

13. The non-transitory, computer-readable medium of claim 10, wherein the display parameter comprises a display location parameter and each frame of compression parameter determined based on an animation effect.

14. The non-transitory, computer-readable medium of claim 13, wherein displaying at least a part of the endpoint image frame by frame in an animation area at the interval by using a changing display parameter, until the endpoint image is finally displayed comprises:

displaying, frame by frame in the animation area at the interval by using the display location parameter, an endpoint image obtained by performing compression based on the compression parameter of the frame, until an endpoint image matching the animation area is finally displayed.

15. The non-transitory, computer-readable medium of claim 9, wherein a shape and a size of the hidden canvas are the same as those of the animation area.

16. The non-transitory, computer-readable medium of claim 9, wherein the operations further comprise: deleting the hidden canvas after the endpoint image is stored.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by one or more processors, a user input comprising a drawing and an animation effect, the drawing comprising an endpoint image to be displayed on a hidden canvas;
storing, by the one or more processors, the endpoint image as the last frame of a plurality of frames;
determining, by the one or more processors, a display parameter that changes based on an animation effect, wherein the display parameter comprises an image displaying parameter and a display location parameter;
processing, by the one or more processors, at least a portion of the endpoint image using a variable dimension ratio of the endpoint image to generate at least a processed portion of the endpoint image for each frame of the plurality of frames, the variable dimension ratio being determined based on the image displaying parameter and gradually changing between the plurality of frames to generate an animation of the endpoint image corresponding to the image displaying parameter; and
displaying frame by frame, in an animation area at an interval each frame of the plurality of frames using the display location parameter, until the endpoint image is displayed.

18. The system of claim 17, wherein the display parameter comprises an endpoint image displaying parameter used to process the endpoint image to obtain each frame of image, the display location parameter used to determine a display location of each frame of image in the animation area, and adjacent frames that are different in at least one of an endpoint image displaying parameter and the display location parameter.

19. The system of claim 18, wherein the display parameter comprises each frame of display location parameter determined based on an animation effect and a screenshot parameter.

20. The system of claim 19, wherein displaying at least a part of the endpoint image frame by frame in an animation area at a interval by using a changing display parameter, until the endpoint image is finally displayed comprises:
displaying, frame by frame in the animation area at the interval by using the display location parameter of the frame, a part of the endpoint image captured based on the screenshot parameter of the frame, until the entire endpoint image is finally displayed.

* * * * *